United States Patent [19]

Abrevaya et al.

[11] Patent Number: 5,019,254
[45] Date of Patent: May 28, 1991

[54] FILTER PAD WITH POCKET AND METHOD OF USING THE SAME

[75] Inventors: Albert Abrevaya, Chalfont; Joel M. Goldstein, Ambler, both of Pa.

[73] Assignee: Aquarium Pharmaceuticals, Inc., Chalfont, Pa.

[21] Appl. No.: 394,598

[22] Filed: Aug. 16, 1989

[51] Int. Cl.⁵ .................................................. E04H 3/16
[52] U.S. Cl. ..................................... 210/169; 210/282; 210/496; 210/502.1; 210/504; 210/505; 210/507
[58] Field of Search ................... 210/501, 502.1, 503, 210/505, 282, 266, 169, 504, 507, 496

[56] References Cited

U.S. PATENT DOCUMENTS

| | | | |
|---|---|---|---|
| 1,830,664 | 11/1931 | Kracklauer | 210/266 |
| 2,750,027 | 6/1956 | Cummings | 206/6.5 |
| 3,224,586 | 12/1965 | Wade | 210/282 |
| 3,327,859 | 6/1967 | Pall | 210/266 |
| 3,388,536 | 6/1968 | Nash | 210/496 |
| 3,951,812 | 4/1976 | Hsu | 210/282 |
| 4,005,010 | 1/1977 | Lunt | 210/282 |
| 4,016,080 | 4/1977 | Williams | 210/502.1 |
| 4,111,813 | 9/1978 | Preus | 210/282 |
| 4,124,116 | 11/1978 | McCabe, Jr. | 210/502.1 |
| 4,155,971 | 5/1979 | Wysong | 264/204 |
| 4,160,059 | 7/1979 | Samejima | 210/505 |
| 4,256,728 | 3/1981 | Nishino et al. | 423/230 |
| 4,272,264 | 6/1981 | Cullen et al. | 210/282 |
| 4,305,782 | 12/1981 | Ostreicher et al. | 210/505 |
| 4,395,332 | 7/1983 | Klein | 210/505 |
| 4,437,429 | 3/1984 | Goldstein et al. | 119/1 |
| 4,488,969 | 12/1984 | Hou | 210/692 |
| 4,497,712 | 2/1985 | Cowling | 210/282 |
| 4,525,410 | 6/1985 | Hagiwara et al. | 604/360 |
| 4,565,727 | 1/1986 | Giglia et al. | 210/505 |
| 4,714,547 | 12/1987 | Willinger | 210/282 |
| 4,781,897 | 11/1988 | Geron et al. | 210/169 |
| 4,793,837 | 12/1988 | Pontius | 55/316 |
| 4,838,947 | 6/1989 | Levy et al. | 210/282 |
| 4,851,273 | 7/1989 | Brown, Jr. | 210/505 |

FOREIGN PATENT DOCUMENTS

| | | | |
|---|---|---|---|
| 2362860 | 6/1975 | Fed. Rep. of Germany | 210/282 |
| 2504688 | 8/1976 | Fed. Rep. of Germany | 210/282 |
| 825029 | 2/1938 | France | 210/282 |
| 576872 | 3/1978 | Switzerland | 210/282 |
| 1472060 | 4/1977 | United Kingdom | 210/282 |

*Primary Examiner*—Stanley Silverman
*Assistant Examiner*—Cynthia L. Nessler
*Attorney, Agent, or Firm*—Panitch, Schwarze, Jacobs & Nadel

[57] ABSTRACT

Filter pads useful for filtering and removing contaminants from fluids comprise at least two pad layers of a permeable, nonwoven polymer material, where one pad layer is connected to another pad layer to form a pocket therebetween having an opening extending into the pocket and at least one of the pad layers has sufficient structural integrity or rigidity to maintain the shape of the filter pad in a filter apparatus during use. In addition, methods for removing contaminants from fluids comprise passing fluid through filter pads having a pocket having an opening extending therein.

25 Claims, 2 Drawing Sheets

FILTER PAD WITH POCKET AND METHOD OF USING THE SAME

BACKGROUND OF THE INVENTION

1. Field of the Invention

The present invention relates to filter pads with a pocket useful for filtering and removing contaminants and toxins from fluids. In addition, the present invention is directed to methods for removing contaminants and toxins from fluids using the filter pad with pocket.

2. Description of the Prior Art

It is known in the biological arts that ammonia and other fluid toxins and solid waste materials are excreted by animals as a result of normal animal metabolism. In addition, in substantially enclosed ecosystems, such as an aquarium, particulate matter or detritus from excreted solids or decayed solids accumulate, requiring removal to maintain a balanced, safe and relatively odor free ecosystem. Conventional methods for removing or neutralizing ammonia and other fluid toxins, odor causing chemicals, such as hydrogen sulfide, and various organic chemicals, as well as removing particulate waste material, include the use of zeolite and/or activated carbon in the form of loose chips, granules or a powder through which a fluid must pass. Such methods, however, are generally inconvenient and inefficient because the proper amount of zeolite and/or activated carbon must be measured and added to a filter container. The zeolite and/or activated carbon chips, granules or powder is messy to handle and also difficult to remove from the filter because the filter must be disassembled and cleaned prior to refilling with new zeolite and/or activated carbon.

Conventional methods for removing particulate waste material include the use of filters comprising a loose fibrous material typically packed into a filter container. However, such filtering techniques are inconvenient and inefficient because the loose fibers are difficult and messy to insert and remove and may be too loosely or too densely packed, thereby reducing filtering efficiency.

Several methods and apparatus have been developed to combine the filtering properties of certain materials, such as zeolite and activated carbon and the physical filtering properties of fibrous filter materials. Bags or pouches of fibrous filter material containing activated carbon on the like inside the bags or pouches have been on the market. Examples include the Whisper ® Bio-Bag ® sold by Willinger Bros., Inc., Wright Brothers Way, Oaklyn, N.J., and a filter product of Ginger Products Co., Toledo, Ohio. Both products are used in fish aquariums by placing the products in a filter assembly, such as an aquarium power filter, so that the aquarium water can pass through them.

The Bio-Bag ® product comprises a fibrous filter material sewn together to form an open pouch in which activated carbon granules are disposed. The product is provided with a clip to close the open top for replacing the bag and its contents. However, the Bio-Bag ® product is not structurally self-supporting and requires an internal frame to maintain its structural integrity in the filter assembly to facilitate fluid flow therethrough. This internal frame, which may be reused, increases the cost and complexity of the filter.

The Ginger Products filter also has an internal frame which is sealed to the external polymeric fiber material. Moreover, this product is sealed before it is sold, so the consumer or other user cannot conveniently add, remove or change the contents of the pouch.

The Ammo-Carb TM Hydro-Pouch TM, manufactured and sold by the assignee of the present invention, comprises a sealed polymer mesh bag containing zeolite and activated carbon chips. However, the Hydro-Pouch TM polymer mesh bag does not filter solid waste particles and the pouch lacks structural integrity, thereby requiring insertion into a filter container in such a position to prevent the pouch from being dislodged when fluid is passed therethrough.

In addition, pads of filter material, such as nonwoven polymeric material of varying density in which the fibers are bound together to be substantially self-supporting, are also in use. Such pads have been impregnated with activated carbon and/or zeolite and used in various filtering environments, including aquariums, pet litter boxes and industrial filtering applications. For example, copending U.S. patent application Ser. No. 208,316 discloses a zeolite impregnated pad, which has use as a filter. U.S. Pat. No. 4,793,837 of Pontius discloses a filter pad impregnated with a combination of activated carbon and zeolite particles.

Such impregnated pads are unitary structures without pockets. Thus, the prior art impregnated pads are not particularly useful where it is desired to use filtering materials other than or in addition to the impregnated material, such as zeolite and/or activated carbon, or where no chemical filtering material, such as zeolite and/or activated carbon is desired.

In view of the deficiencies and inefficiencies of the prior art, it would be desirable to have a filter pad with a pocket in which a filter material may be disposed, which does not require a specially attached separate structure to maintain its shape during filtering use and which is relatively simple and inexpensive to manufacture and use

SUMMARY OF THE INVENTION

According to the present invention, a filter pad for filtering fluids comprises at least two pad layers of a permeable, nonwoven polymer material, wherein one pad layer is connected to another pad layer to form a pocket therebetween having an opening extending into the pocket and at least one of the pad layers is sufficiently rigid to maintain the shape of the filter pad in a filter apparatus during use.

In addition, the present invention is directed to methods for removing ammonia and substances capable of being adsorbed on activated carbon, respectively, from a fluid containing such substances, comprising passing the fluid through the pocket filter pad described above wherein at least zeolite or activated carbon, respectively, is bonded substantially throughout one pad layer.

BRIEF DESCRIPTION OF THE DRAWINGS

The foregoing summary of the invention, as well as the following detailed description of preferred embodiments, will be better understood when read in conjunction with the appended drawings. For the purpose of illustrating the invention, there shown in the drawings embodiments which are presently preferred, it being understood, however, that the invention is not limited to the specific arrangements and instrumentalities disclosed. In the drawings.

DETAILED DESCRIPTION OF PREFERRED EMBODIMENTS

Figure 1:
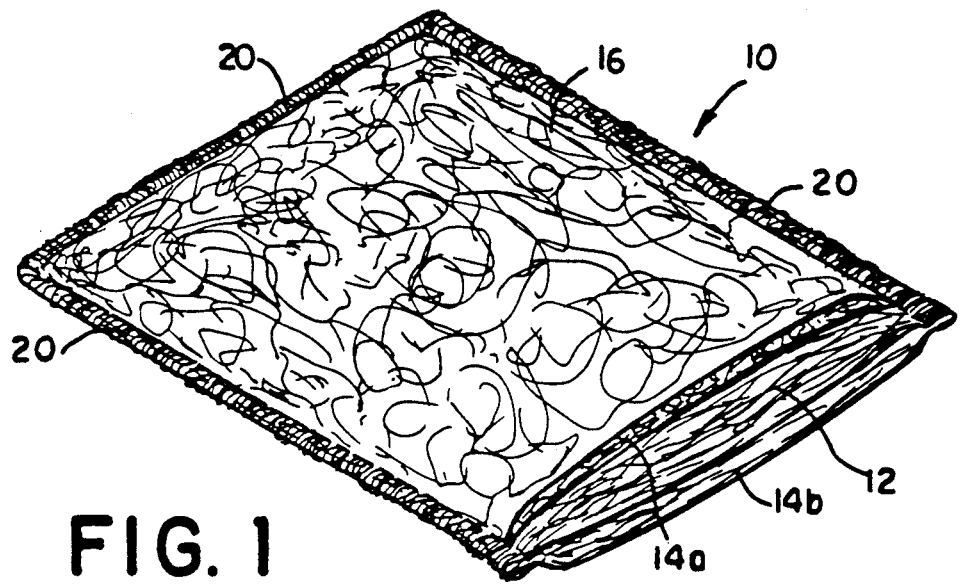
FIG. 1 is a generalized isometric view showing a rectangular filter pad with a pocket having two layers sewn together on three sides thereof according to the present invention and an opening extending into the pocket.

Referring to the drawings, wherein like numerals indicate like elements throughout the several views, there shown in FIGS. 1 through 5 a filter pad 10 with a pocket 12 and an opening 13 extending into the pocket 12, according to the present invention.

In accordance with the present invention, the filter pad 10 comprises at least two layers, illustrated in the embodiment of FIGS. 1 through 5 as layers 14a, 14b and 14c, of a permeable, nonwoven polymer material 16. Preferably, the permeable, nonwoven polymer material 16 comprises a lofty, nonwoven mat or pad of polymeric fibers 18 generally randomly oriented throughout the polymer material 16 and bonded together at points where the fibers 18 contact each other. The fibers 18 may be of any length suitable for forming nonwoven pads 16 and should be strong enough to withstand forces exerted on the fibers 18 during use of the filter pad 10 (discussed below) in accordance with the present invention. One skilled in the art will recognize that such polymeric fibers pads are generally well-known and may be formed, for example, on a Rando-Webber machine from natural or synthetic polymeric fibers. Examples of synthetic polymeric fibers include polyester, polypropylene, rayon and nylon. Preferably, the fibers 18 comprise polyester and, more preferably, polyethylene terephthalate polyester. Manufactures of such nonwoven polyester pads include the Union Wadding Company in Pawtucket, R.I., Cumulus Fibers, Inc. in Charlotte, N.C. and Moldan, Inc. in North Carolina.

Preferably, pad layers 14a, 14b and 14c comprising a lofty, nonwoven mat or pad of polymeric fibers 18 have a density of about 2 oz/yd$^2$ to about 13 oz/yd$^2$, depending on the type of use of the filter pad 10, the type and denier of polymeric fibers 18 and the method of manufacturing the polymer material 16, among other factors. One skilled in the art may readily determine the desired density of the polymer material 16, in view of this disclosure. Preferably, however, the polymer material 16 should allow a fluid to flow therethrough, should not rip or tear during a normal useful life for a filter, and the pad layers 14a, 14b 14c comprised of the polymer material 16 must be capable of being connected to one another without ripping or tearing.

Figure 2:
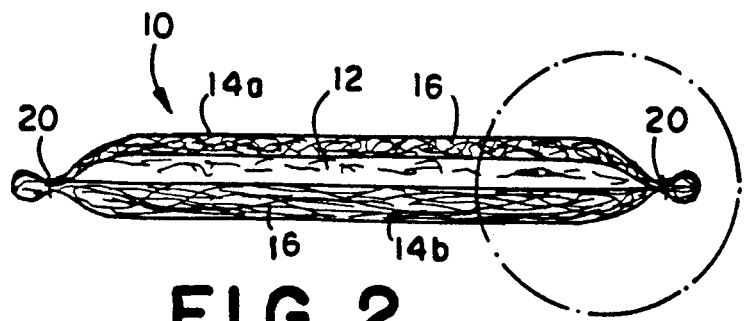
FIG. 2 is a side elevational view of the filter pad shown in FIG. 1.
Figure 3:
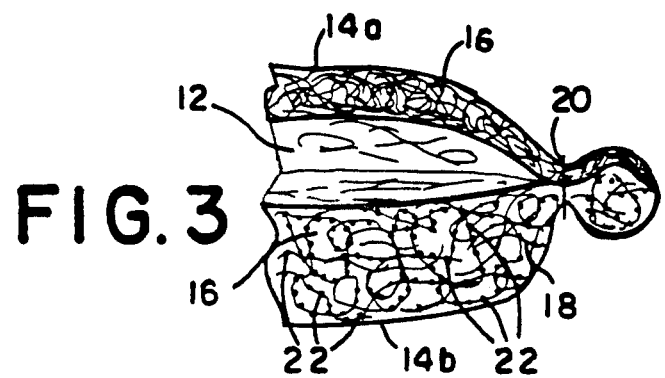
FIG. 3 is an enlarged side elevational view of the area circled in FIG. 2, showing a representative drawing of filter material particles bonded to the pad fibers according to the present invention.

According to the present invention, at least one pad layer 14a, 14b or 14c must have sufficient structural integrity or rigidity to maintain the shape of the filter pad 10 in a filter apparatus (not shown) during use without the use of separate internal or external support members attached to the pad. Preferably, as illustrated in FIGS. 1 through 3, the filter pad 10 has one pad layer 14b which is sufficiently rigid to maintain the shape of the filter pad 10 in a filter apparatus during use. While more than one pad layer 14a, 14b or 14c may be sufficiently rigid or two or more pad layers 14a, 14b or 14c combined may be sufficiently rigid to maintain the shape of the filter pad 10, one skilled in the art will appreciate that it may be more economical to have only one pad layer 14a, 14b or 14c which is sufficiently rigid to maintain the shape of the filter pad 10 in a filter apparatus during use.

The pad layer 14a, 14b or 14c which is sufficiently rigid to maintain the shape of filter pad 10, such as pad layer 14b illustrated in FIG. 1, should be thick enough and/or dense enough to exhibit the desired structural integrity to be self-supporting in use. The desired rigidity depends on several factors, including the density and viscosity of the fluid to be filtered and the force with which the fluid will be passed through the filter pad 10. For example, where the fluid to be filtered is water, a pad layer 14a, 14b or 14c comprising a lofty, nonwoven pad of polymeric fibers 18 preferably has a density of at least about 9 oz/yd$^2$ to about 13 oz/yd$^2$ or more, depending on the particular use for the filter pad 10. It is presently preferred that the rigid pad layer 14a, 14b or 14c has a density of about 9 oz/yd$^2$ where fish aquarium water is the fluid to be filtered.

Generally, the rigid pad layer (14b in FIGS. 1-3) has a thickness of about 0.125 inch to about 1 inch or more, depending on the particular use. In one embodiment of the present invention illustrated in FIGS. 1-3, for example, the rigid pad layer 14b has a density of about 9 oz/yd$^2$ and a thickness of about 0.375 to about 0.50 inch, although one skilled in the art will understand that the pad may be thicker or thinner if desired. Non-rigid layers (e.g., 14a in FIGS. 1-3) preferably have a density of about 2 oz/yd$^2$ and a thickness of about 0.125 to about 0.25 inch, although thinner or thicker non-rigid layers may also be used.

Further according to the present invention, at least one pad layer 14a, 14b or 14c is attached to the rigid pad layer 14a, 14b or 14c to form a pocket 12 therebetween having an opening 13 extending into the pocket. For example, in one embodiment of the present invention, illustrated in FIGS. 1 through 3, pad layer 14a and the rigid pad layer 14b have a rectangular shape and are connected to each other on three sides thereof. One skilled in the art will appreciate, however, that filter pads 10 of varying shapes may be used in accordance with the present invention.

The opening 13 may typically be an open end formed by not connecting complementary edges of the pad layers (14a and 14b, for example) on one side thereof. Also typically, the opening 13 will be oriented to be at the top of the pocket filter pad 10 in use to best retain any material contained in the pocket 12. It should be understood, however, that the opening 13 into the pocket may be in the form of a slit, such as an elongated slit, formed in one of the pad layers 14a, 14b or 14c, preferably near the top of the pocket filter pad 10, a circular or other shaped hole formed in a pad layer, or any other opening of suitable size and shape to fill and empty the pocket conveniently.

The pad layers may be connected to each other to form the pocket 12 using various methods and techniques which are within the ability of one of ordinary skill in the art. For example, a rigid pad layer 14b may be connected to pad layer 14a by sewing or stitching the pad layers together with a natural or synthetic thread 20 as illustrated in FIGS. 1–3. In addition, pad layers 14a, 14b and 14c comprising a permeable, nonwoven polymer material 16 may be connected to each other by heat bonding or welding or sonic bonding or welding using techniques and apparatus known in the art for connecting or bonding polymer materials. Preferably, the pad layers 14a, 14b and 14c should be substantially permanently connected to each other so that they do not separate during the useful life of the filter pad 10.

The pocket 12 is adapted to contain a filter material (not shown). For example, it may be desired to increase the filtering capacity, ability or efficiency of a filter pad 10 according to the present invention, or to change the nature of materials filtered or adsorbed from the fluid being filtered. For example, zeolite is used primarily because it adsorbs ammonia, while activated carbon is used primarily because it adsorbs organic molecules and inorganic molecules responsible for causing odors and undesirable colors. Where it is desired to increase or change the filtering efficiency, capacity or ability of the filter pad 10, adsorbents or other filter material may be disposed in the pocket 12 in amounts sufficient to achieve the desired result, which amounts may be readily determined by one skilled in the art.

Preferred examples of filter materials which may be added to the pocket 12 for use with the filter pad 10 include zeolite and/or activated carbon, preferably in the form of commercially available chips or powder, and most preferably in the form of chips to reduce the potential clogging of the porous filter pad layers 14a, 14b and 14c. Another example includes biological filter media, such as Bio-Chem ™ Beads, available from Aquarium Pharmaceuticals, Inc. Bio-Chem ™ Beads is a beadlike product having a high surface area-to-volume ratio serving as a growth medium in and on which bacteria, such as nitrifying bacteria, can grow. The bacterial colonies developed on such biological filter media are then available to convert ammonia to the less toxic forms nitrite and nitrate. One skilled in the art will appreciate, however, that other filter materials may be disposed in the pocket 12 of the filter pad 10 and may readily determine the filter material desired based on the particular use of the filter pad 10.

It is presently preferred that at least one pad layer 14a, 14b or 14c have an adsorbent 22 bonded substantially throughout the pad layer 14a, 14b or 14c, such as the rigid pad layer 14b illustrated in FIG. 3, although the adsorbent 22 may be bonded throughout any pad layer 14a, 14b or 14c or all pad layers 14a, 14b and 14c. The adsorbent 22 should be capable of removing or adsorbing toxins and other harmful or undesirable pollutants or contaminants from the fluid to be filtered and must be capable of being bonded substantially throughout a pad layer 14a, 14b or 14c without interfering with the mechanical filtering properties of the filter pad 10. Presently preferred adsorbents include zeolite and activated carbon.

Zeolites are a group of aluminosilicates having a tetrahedral framework and are generally used as a very fine powder, although zeolite chips are readily commercially available. Several examples of zeolites, their general characteristics and geographic points of mining zeolites are disclosed in U.S. Pat. No. 4,437,429, the disclosure of which is incorporated herein by reference. Preferably, the zeolite used in the present invention is selected from the group consisting of analcime, sodalite, chabazite, natrolite, phillipsite, mordenite and clinoptilolite. The presently preferred zeolite comprises clinoptilolite.

Activated carbon, including the compound commonly called activated charcoal, is an amorphous form of carbon characterized by high adsorptivity for many gases, vapors and colloidal solids. Carbon is generally obtained by the destructive distillation of wood, nutshells, animal bones or other carbonaceous material. The carbon is "activated" by heating to about 800°–900° C. with steam or carbon dioxide, which results in a porous internal structure. The internal surface are of activated carbon averages about 10,000 square feet per gram.

Preferably, zeolite and/or activated carbon in the form of small particles or a powder is bonded substantially throughout at least one pad layer 14a, 14b or 14c using methods known and available to one skilled in the art, such as the methods disclosed in the above-mentioned U.S. copending patent application Ser. No. 208,316 for "Zeolite-Impregnated Pads and Methods for Producing and Using Same," or U.S. Pat. No. 4,793,837. In general, a slurry of the adsorbent and an effective binding agent, such as a latex based adhesive, or other binder well-known to those skilled in the art, is prepared. The slurry is then impregnated throughout the pad layer desired to be impregnated by conventional techniques. Typically, a web of pad material is passed through the slurry in a dip tank of a padding machine, after which the impregnated pad passes through squeeze rollers and a drying oven. One skilled in the art will appreciate that where an adsorbent 22 is bonded substantially throughout a pad layer 14a, 14b or 14c, the rigidity of the pad layer 14a, 14b or 14c may be increased. It may be desirable, therefore, to form the rigid pad layer (14b in FIGS. 1–3) by impregnating the pad layer 14b with an adsorbent 22, although this is not necessary in accordance with the present invention.

Figure 4:
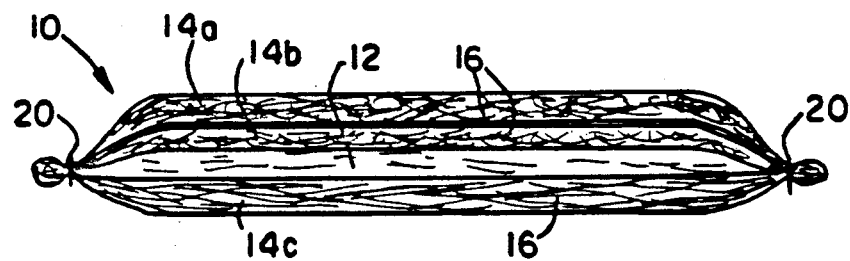
FIG. 4 is a side elevational view showing another embodiment of a filter pad with a pocket and having three layers according to the present invention.
Figure 5:
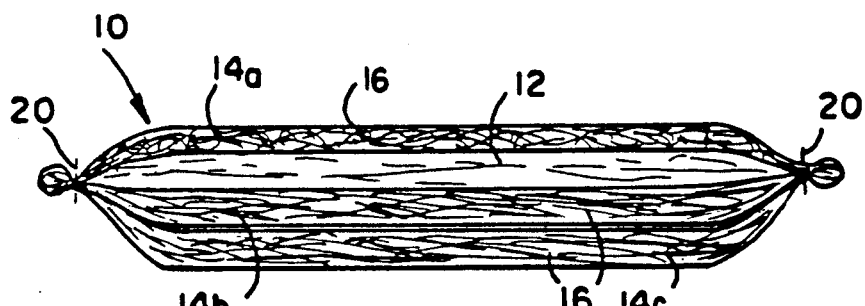
FIG. 5 is a side elevational view showing still another embodiment of the present invention.

The adsorbent 22 may be bonded in some or all pad layers 14a, 14b or 14c. For example, where three pad layers are used, it may be desirable to have two layers having the same or different adsorbents 22 bonded substantially throughout each of the layers, as shown in FIGS. 4 and 5. It will be apparent in view of this disclosure, for example, that where it is desired to have a filter pad 10 capable of removing ammonia and odor-causing organic material from a fluid, zeolite may be bonded substantially throughout one pad layer (e.g., 14c ) and activated carbon substantially bonded throughout a second pad layer (e.g., 14b ) where the pad layers are connected to each other so that they are in substantially complete engagement with each other (i.e., no pocket is formed therebetween) and a third pad layer (e.g., 14a ) having no adsorbent therein, where the pocket 12 is formed between pad layer 14a and the combined or attached layers 14b and 14c, as illustrated in FIG. 4. Another possible combination would be to have both zeolite and activated carbon bonded substantially throughout one pad layer 14a, 14b or 14c.

One skilled in the art may readily determine the number of pad layers used and the desired presence or absence and composition of one or more adsorbents 22 throughout each of the pad layers, depending on the particular use desired for the filter pad 10 in view of the present disclosure.

It is often desirable to have means for determining whether and to what degree the filter pad 10 is efficiently filtering a particular fluid. To assist the user of a filter pad 10 in making this determination, it is preferred to have a pad layer 14a, 14b or 14c be a light color, preferably a shade of white, to indicate the presence or absence of filtered materials. It will be understood that a filter pad layer 14a, 14b or 14c having a light color will readily indicate the presence of filtered materials, usually particulate materials, by discoloration or occlusion of the light color.

The filter pad 10 according to the present invention may be used to filter or remove solid and fluid contaminants, toxins and other undesirable materials from a fluid by passing the fluid through the filter pad 10. For example, in accordance with the present invention, where it is desired to remove ammonia from an ammonia-containing fluid, such as water, the fluid is passed through the filter pad 10 wherein at least one pad layer 14a, 14b or 14c has an adsorbent 22 comprising at least zeolite bonded substantially throughout the pad layer 14a, 14b or 14c.

Where a pad layer 14a, 14b or 14c having a light color to indicate the presence or absence of filtered materials is used in accordance with the present invention, it is preferred that the fluid to be filtered be directed so that it passes through the light colored pad layer 14a, 14b or 14c first to help determine the useful life of the filter pad 10 during use.

Further in accordance with the present invention, it may be desired to filter a fluid through the filter pad 10 as described above wherein the pocket 20 contains a filtering material, such as zeolite, activated carbon and/or a biological filter medium, such as Bio-Chem ™ Beads. Again, where it is desired to have a filter pad 10 having a pad layer 14a, 14b or 14c having a light color, it is preferred that the fluid is passed through the filter pad 10 in a direction so that the fluid first passes through the light colored pad layer 14a, 14b or 14c before the fluid passes through the pocket 12 containing a filter material and before passing through a pad layer 14a, 14b or 14c having an adsorbent 22, such as zeolite, bonded substantially throughout the pad layer 14a, 14b or 14c where an adsorbent 22 is desired.

Examples of fluids suitable for filtering with a filter pad 10 in accordance with the present invention include gas and liquid and, in particular, air and water. One skilled in the art will appreciate, however, that other particulate, toxin and/or other contaminant-containing fluids may be filtered in accordance with the present invention.

The present invention may be embodied in other specific forms without departing from the spirit or essential attributes thereof and, accordingly, reference should be made to the appended claims, rather than to the foregoing specification as indicating the scope of the invention.

We claim:

1. An aquarium filter pad for filtering aquarium water comprising at least two pad layers of a permeable, nonwoven polymer material, wherein one pad layer is connected to another pad layer to form a pocket therebetween having an opening extending into the pocket, at least one of the pad layers being sufficiently rigid to maintain the shape of the filter pad in an aquarium filter apparatus during use, said at least one rigid pad layer having a density of at least about 9 oz/yd$^2$.

2. The filter pad according to claim 1, wherein one of the pad layer comprises a permeable, nonwoven polymer material having an adsorbent selected from the group consisting of zeolite and activated carbon bonded substantially throughout the pad layer and being sufficiently rigid to maintain the shape of the filter pad in a filter apparatus during use and another pad layer comprises a permeable, nonwoven polymer material.

3. The filter pad according to claim 1, wherein the filter pad comprises two pad layers.

4. The filter pad according to claim 1, wherein the pad layers having a substantially rectangular shape are connected to each other along three sides thereof to form a pocket therebetween.

5. The filter pad according to claim 4, wherein the pad layers are heat sealed together on three sides thereof.

6. The filter pad according to claim 4, wherein the pad layers are sewn together on three sides thereof.

7. The filter pad according to claim 1, wherein first and second pad layers are connected to each other substantially completely along peripheral edges thereof and a third pad layer is connected to the second pad layer to form a pocket between the second and third pad layers having an opening extending into the pocket, at least one of the first and second pad layers being sufficiently rigid to maintain the shape of the filter paid in a filter apparatus during use.

8. The filter pad according to claim 7, wherein the first pad layer comprises a permeable, nonwoven polymer material having zeolite bonded substantially throughout the first pad layer, the second pad layer comprises a permeable, nonwoven polymer material having activated carbon bonded substantially throughout the second pad layer and the third pad layer comprises a permeable, nonwoven polymer material.

9. The filter pad according to claim 8, wherein the third pad layer has a color sufficient to indicate the presence of filtered materials which discolor or occlude the color of the third pad layer.

10. The filter pad according to claim 1, wherein the nonwoven polymer material comprises a lofty, nonwoven pad of polymeric fibers generally randomly oriented throughout the polymer material and bonded together at points where the fibers contact each other.

11. The filter pad according to claim 10, wherein the fibers comprise polyethylene terephthalate.

12. The filter pad according to claim 10, wherein the polymer pad material has a density of about 2 oz/yd$^2$ to about 13 oz/yd$^2$.

13. The filter pad according to claim 12, wherein the rigid pad layer has a density of at least about 9 oz/yd$^2$ to about 13 oz/yd$^2$.

14. The filter pad according to claim 1, further comprising a filter material selected from the group consisting of zeolite, activated carbon and a biological filter medium disposed in the pocket.

15. The filter pad according to claim 14, wherein the filter material is present in a form selected from the group consisting of chips, powders and beads.

16. A method for removing contaminants from a contaminant-containing fluid comprising passing the fluid through the filter pad according to claim 1.

17. The method according to claim 16, wherein the fluid is a liquid.

18. The method according to claim 17, wherein the liquid is water.

19. The method according to claim 16, wherein the fluid is passed through the filter pad in a direction so that the fluid first passes through a pad layer having a color sufficient to indicate the presence of filtered materials which discolor or occlude the colored pad layer.

20. The method according to claim 19, wherein the fluid is further passed through the pocket after passing through the colored pad layer, the pocket having a filter material selected from the group consisting of zeolite, activated carbon and a biological filter medium disposed therein.

21. The method according to claim 16, wherein one layer of the filter pad comprises a permeable, nonwoven polymer material having an adsorbent selected from the group consisting of zeolite and activated carbon bonded substantially throughout the pad layer.

22. The method according to claim 21, wherein the contaminant is capable of being adsorbed by zeolite and the adsorbent comprises zeolite.

23. The method according to claim 22, wherein the contaminant is ammonia.

24. The method according to claim 21, wherein the contaminant is capable of being adsorbed by activated carbon and the adsorbent is activated carbon.

25. The method according to claim 24, wherein the contaminant is hydrogen sulfide.

* * * * *